(12) United States Patent
Eckhoff et al.

(10) Patent No.: US 8,327,625 B2
(45) Date of Patent: Dec. 11, 2012

(54) METHOD FOR REGENERATING SOOT FILTERS IN THE EXHAUST GAS SYSTEM OF A LEAN MIX ENGINE, AND EXHAUST GAS SYSTEM THEREFOR

(75) Inventors: Stephan Eckhoff, Alzenau (DE); Ina Grisstede, Mannheim (DE); Wilfried Mueller, Karben (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 282 days.

(21) Appl. No.: 12/525,190

(22) PCT Filed: Jan. 31, 2008

(86) PCT No.: PCT/EP2008/000771
§ 371 (c)(1),
(2), (4) Date: Dec. 30, 2009

(87) PCT Pub. No.: WO2008/092691
PCT Pub. Date: Aug. 7, 2008

(65) Prior Publication Data
US 2010/0101210 A1  Apr. 29, 2010

(30) Foreign Application Priority Data
Jan. 31, 2007 (EP) .................... 07002040

(51) Int. Cl.
*F01N 3/023* (2006.01)
*F01N 3/10* (2006.01)

(52) U.S. Cl. ............... 60/295; 60/297; 60/286; 60/287

(58) Field of Classification Search ............ 60/295, 60/297, 286, 287
See application file for complete search history.

(56) References Cited

U.S. PATENT DOCUMENTS

| 4,671,059 A | * | 6/1987 | Lawson | 60/309 |
| 4,685,291 A | * | 8/1987 | Ha | 60/286 |
| 6,023,929 A | * | 2/2000 | Ma | 60/295 |

(Continued)

FOREIGN PATENT DOCUMENTS

| DE | 10146916 | 4/2003 |
| DE | 10393184 | 9/2005 |
| FR | 2810073 A1 | 12/2001 |

(Continued)

OTHER PUBLICATIONS

International Search Report (PCT/EP2008/000771) Apr. 30, 2008.

(Continued)

*Primary Examiner* — Thomas Denion
*Assistant Examiner* — Brandon Lee
(74) *Attorney, Agent, or Firm* — Kalow & Springut LLP

(57) ABSTRACT

To adhere to legal exhaust-gas regulations, the exhaust gases of a lean-burn engine must be freed from soot particles and nitrogen oxides. It is proposed that the cylinders of the lean-burn engine be divided into two groups which discharge their exhaust gases into two associated exhaust lines which each comprise a soot filter and which are merged at an opening-in point into a common exhaust line. The common exhaust line comprises the catalytic converter for the removal of the nitrogen oxides. By regenerating the two soot filters at different times, the exhaust-gas temperature in the common exhaust line is limited to a mean temperature between the exhaust-gas temperature of normal operation and that of regeneration operation, and the catalytic converter for the removal of the nitrogen oxides is preserved.

19 Claims, 2 Drawing Sheets

U.S. PATENT DOCUMENTS

| | | | |
|---|---|---|---|
| 6,237,329 B1 * | 5/2001 | Mizuno | 60/285 |
| 6,274,107 B1 * | 8/2001 | Yavuz et al. | 423/213.5 |
| 6,858,193 B2 * | 2/2005 | Ruwisch et al. | 423/213.5 |
| 6,938,411 B2 * | 9/2005 | Hoffmann et al. | 60/295 |
| 7,055,311 B2 * | 6/2006 | Beutel et al. | 60/285 |
| 2004/0098974 A1 * | 5/2004 | Nieuwstadt et al. | 60/286 |
| 2006/0010859 A1 * | 1/2006 | Yan et al. | 60/286 |
| 2006/0153761 A1 * | 7/2006 | Bandl-Konrad et al. | 423/239.1 |

FOREIGN PATENT DOCUMENTS

| | | |
|---|---|---|
| JP | 2004162600 | 6/2004 |
| JP | 2005256666 | 9/2005 |
| JP | 2006233893 | 9/2006 |

OTHER PUBLICATIONS

Written Opinion (PCT/EP2008/000771) Jul. 30, 2009.

* cited by examiner

METHOD FOR REGENERATING SOOT FILTERS IN THE EXHAUST GAS SYSTEM OF A LEAN MIX ENGINE, AND EXHAUST GAS SYSTEM THEREFOR

FIELD OF THE INVENTION

The invention relates to a method for regenerating soot filters in the exhaust system of a lean-burn engine, by means of which method the emissions of nitrogen oxides during regeneration can be reduced.

BACKGROUND OF THE INVENTION

Lean-burn engines are operated predominantly with a lean air/fuel mixture over their time of operation. Lean-burn engines include diesel engines and lean-burn spark-ignition engines.

To improve air quality, exhaust-gas legislation in Europe and in other industrial countries is being made ever more stringent. Following the ruling of the European parliament, the limit values of Euro 5 should become legally binding for new vehicles from Sep. 1, 2009 onwards, and the limit values of Euro 6 from Sep. 1, 2014 onwards. Euro 5 defines limit values for diesel vehicles of 180 mg/km for nitrogen oxides and 5 mg/km for soot particles. With Euro 6, the limit value for nitrogen oxides will be reduced to 80 mg/km. In California, a limit value of 50 mg NOx/mile and 10 mg soot/mile has been in force even since 2007.

The exhaust gas of lean-burn engines contains, as pollutants, unburned hydrocarbons, carbon monoxide, nitrogen oxides and soot. The planned limit values for the concentrations of nitrogen oxides and soot in the exhaust gas can no longer be achieved using engine-internal measures alone; exhaust-gas aftertreatment is in fact necessary for this purpose: the nitrogen oxides can be converted using nitrogen oxide storage catalytic converters or SCR catalytic converters, and the soot can be filtered out using a soot filter. A soot filter must be regenerated every 500 to 1000 km traveled by raising the exhaust-gas temperature to more than 550° C. and burning off the soot which has been deposited in the filter. However, the regeneration of the soot filter, which lasts approximately 15 minutes, makes it difficult to adhere to the nitrogen oxide limit values: the catalytic activity of the catalytic converters which are used for nitrogen oxide reduction is low at the high temperatures which occur during the filter regeneration. Furthermore, the high exhaust-gas temperatures damage the catalytic converters.

The present invention is concerned with the aftertreatment of exhaust gas in a lean-burn engine having catalytic converters for converting the nitrogen oxides and having a soot filter. The catalytic converters for converting the nitrogen oxides are also referred to below as denitrogenization catalytic converters.

DE 103 93 184 T5 (which corresponds to U.S. Pat. No. 7,055,311 B2) describes a twin-flow exhaust-gas purification system for a diesel engine having a plurality of cylinders. The exhaust-gas purification system comprises a first exhaust line for the exhaust gases of a first group of cylinders and a second exhaust line for the exhaust gases of a second group of cylinders. Arranged in each exhaust line is a nitrogen oxide storage catalytic converter and, if appropriate, a soot filter. The two exhaust lines are merged downstream of the storage catalytic converter at an opening-in point into a common exhaust line. The common exhaust line comprises an oxidation catalytic converter. The compositions of the exhaust gases in the first and second exhaust lines are set independently of one another by the electronic engine controller, such that the exhaust gas in the one line is enriched for the regeneration of the storage catalytic converter while the exhaust gas in the other line is lean. The enrichment and leaning are adjusted such that a lean exhaust gas is present in the common exhaust line downstream of the merging of the two exhaust-gas flows, and any possible leakage of the reducing agent is oxidized on the oxidation catalytic converter.

The inventors of the present patent application have established that the exhaust-gas purification system of DE 103 93 184 T5 is not capable, during the regeneration of the soot filter, of converting the nitrogen oxides which are emitted by the engine into non-harmful components.

SUMMARY OF THE INVENTION

It is therefore an object of the invention to provide a method which ensures a high conversion of the nitrogen oxides even during the regeneration of the soot filters and which reduces the temperature loading of the denitrogenization catalytic converters during the regeneration of the soot filters. It is a further object of the invention to specify an exhaust system suitable for this purpose.

Said object is achieved by means of the method described in claim 1. Preferred embodiments of the invention are described in the dependent claims.

The method assumes a lean-burn engine having a plurality of cylinders, with a first exhaust line receiving the exhaust gases from a first group of cylinders and a second exhaust line receiving the exhaust gases from a second group of cylinders. Each exhaust line comprises at least one soot filter. Both exhaust lines open out downstream of the soot filter into a common exhaust line. For the conversion of the nitrogen oxides, the common exhaust line comprises a denitrogenization catalytic converter. In normal operation of the engine, identical exhaust-gas conditions prevail in both exhaust lines; the soot produced by the engine is filtered out of the exhaust gas by the soot filters and the nitrogen oxides are converted by the denitrogenization catalytic converter. The method is characterized in that the two soot filters are regenerated at different times. For this purpose, the temperature of the exhaust gas in the associated exhaust line is raised to the soot ignition temperature while normal exhaust-gas conditions continue to prevail in the other exhaust line. The two exhaust-gas flows are mixed in the common exhaust line. The mixed exhaust gas therefore assumes a mean temperature which lies between the exhaust-gas temperature of normal operation and the exhaust-gas temperature during regeneration. The nitrogen oxides which are contained in the mixed exhaust-gas flow in the common exhaust line are converted into non-harmful components on the denitrogenization catalytic converter.

DETAILED DESCRIPTION OF THE PREFERRED EMBODIMENTS

'Normal operation' of the engine refers to the operating states during normal driving with the vehicle in city traffic and during freeway driving at moderate speeds. For said operating state, the exhaust-gas temperature lies in the range between 150 and 400° C. This is to be distinguished from the regeneration mode for burning off the soot on one of the two soot filters. For this purpose, the exhaust-gas temperature and therefore the temperature of the soot filter must be raised to the soot ignition temperature. The magnitude of the soot ignition temperature is dependent on whether or not the soot filter is provided with a soot ignition coating. The soot ignition temperature is generally higher than the exhaust-gas temperature in normal operation.

In normal operation, the two groups of cylinders are operated with a lean air/fuel mixture. The exhaust gas is therefore lean in both exhaust lines. To regenerate one of the soot filters by burning off the soot, the exhaust-gas temperature in the corresponding exhaust line must be raised to the soot ignition temperature. Here, the associated group of cylinders continues to be operated with a lean air/fuel mixture. The exhaust gas therefore remains lean and is capable of oxidizing the soot. According to the method, therefore, the exhaust gas in both exhaust lines remains lean during the regeneration of the filter.

In conventional exhaust-gas purification systems, the denitrogenization catalytic converters are arranged upstream or downstream of the soot filter in the same exhaust section, and are therefore acted on with the same hot exhaust gas as the filter during a filter regeneration. At these high temperatures, the catalytic activity of the nitrogen oxide storage catalytic converters is low, and therefore very little conversion of the nitrogen oxides which are contained in the exhaust gas takes place. The positive effect of the invention is now based on the fact that the relatively cold exhaust gas from the normal operation of the one group of cylinders is mixed with the hot exhaust gas from the regeneration operation of the other group of cylinders before said exhaust gas is conducted across the denitrogenization catalytic converter. In this way, the resulting exhaust-gas temperature of the mixed exhaust-gas streams lies within the optimum temperature range of the denitrogenization catalytic converter and therefore permits a good conversion of the nitrogen oxides. This also reduces the thermal aging of the denitrogenization catalytic converter.

A person skilled in the art is familiar with denitrogenization catalytic converters which are suitable for the invention and their modes of operation. These include nitrogen oxide storage catalytic converters, SCR catalytic converters and HC-DeNOx catalytic converters.

When using nitrogen oxide storage catalytic converters, the lean-burn engine must be operated in a cyclically alternating fashion with lean and rich exhaust gas. In the lean phase, which lasts approximately 1 to 2 minutes, the nitrogen oxides which are contained in the exhaust gas are stored on the storage catalytic converter, and during the rich phase, said nitrogen oxides are released again and converted with the reducing constituents of the exhaust gas (unburned hydrocarbons, carbon monoxide and hydrogen) to form nitrogen, carbon dioxide and water. The rich phase lasts only a few seconds. The optimum operating temperature of a nitrogen oxide storage catalytic converter lies in the range between 250 and 400° C. Nitrogen oxide storage catalytic converters are thermally damaged by exhaust-gas temperatures above 550° C.

The mode of operation of nitrogen oxide storage catalytic converters is described in detail in the SAE document SAE 950809. According to said document, during the lean phase, the nitrogen monoxide which is contained in the exhaust gas is oxidized to form nitrogen dioxide, and is subsequently stored as nitrate. For the oxidation of nitrogen monoxide, a storage catalytic converter usually contains platinum, and if appropriate palladium, as catalytically active components. For the storage of the nitrogen oxides as nitrates, use is made of basic oxides, carbonates or hydroxides of alkali metals, earth alkali metals and rare earth metals; use is preferably made of basic compounds of barium and strontium. Suitable nitrogen oxide storage catalytic converters are described, for example, in the applicant's patent U.S. Pat. No. 6,858,193 B2.

SCR catalytic converters can selectively reduce the nitrogen oxides contained in the oxygen-containing exhaust gas, with the addition of ammonia, to form nitrogen. For this purpose, the ammonia or a compound which can break down to form ammonia must be injected into the exhaust gas upstream of the SCR catalytic converter. SCR catalytic converters contain, as catalytically active components, acidic oxides such as, for example, titanium oxide, tungsten oxide and vanadium oxide. Also highly suitable are zeolites which are exchanged with base metals, in particular with iron or copper. Zeolites have a particularly high storage capacity for ammonia, which has a positive effect on their tolerance with respect to fluctuations in the exhaust-gas composition during dynamic operation of the lean-burn engine. The optimum operating temperature of SCR catalytic converters lies between approximately 300 and 500° C. It is possible to obtain conversion efficiencies of up to over 90% with said SCR catalytic converters.

HC-DeNOx catalytic converters can likewise convert the nitrogen oxides contained in the oxygen-containing exhaust gas. In this case, the hydrocarbons contained in the exhaust gas, or hydrocarbons or their decomposition products which are additionally injected into the exhaust gas, serve as reducing agent. For this purpose, it is for example possible for fuel to be injected into the exhaust gas. The selectivity of the reduction of nitrogen oxides using hydrocarbons is significantly lower than the reduction of nitrogen oxides using ammonia. The conversion efficiencies of said HC-DeNOx catalytic converters are therefore only approximately 20 to 60%. Suitable HC-DeNOx catalysts are for example zeolites exchanged with copper, or supported platinum catalysts. The optimum operating range of said HC-DeNOx catalytic converters lies, depending on composition, between 150 and 250° C. for platinum-containing catalytic converters and between 300 and 500° C. for zeolite-based catalytic converters.

For the purposes of the invention, it is possible to use any known soot filters for exhaust gases from lean-burn engines. Particularly suitable are so-called wall-flow filters composed of ceramic such as, for example, cordierite, aluminum titanate and silicon carbide. Here, the soot is deposited on the walls of the flow ducts of the filter bodies. As a result, the exhaust-gas counterpressure increases continuously. When a predefined limit value for the exhaust-gas counterpressure is reached, the filter must be regenerated by burning off the soot. For this purpose, the temperature of the exhaust gas must be increased to the soot ignition temperature. This is approximately 650° C. Said soot ignition temperature may be reduced by 50 to 150° by coating the soot filter with a suitable catalytic mass, a so-called soot ignition coating. For the purposes of the invention, both coated and also non-coated filters may be used.

Various measures are suitable for increasing the exhaust-gas temperature at the location of the filter. The exhaust-gas temperature may for example be increased to the soot ignition temperature by means of engine-internal measures. These include the post-injection of fuel, the setting of a late combustion position, a multi-stage combustion or a combination of these measures. Alternatively, the soot filter may also be heated to the soot ignition temperature by means of external heating, such as for example by means of an electric heater. Another option is to coat the soot filter with an oxidation catalyst and to increase the exhaust-gas temperature to the soot ignition temperature by means of the injection of hydrocarbons or their decomposition products upstream of the respective soot filter, and the catalytic combustion of the hydrocarbons or their decomposition products on the catalytic coating of the filter.

The arrangement according to the invention of soot filters and a denitrogenization catalytic converter may be supplemented by further catalytic converters. For example, oxidation catalytic converters may be arranged upstream of the soot filters. Said oxidation catalytic converters burn the unburned hydrocarbons and carbon monoxide which may still be present in the exhaust gas. Said oxidation catalytic converters are also suitable for heating the downstream soot filter for the regeneration. For this purpose, additional fuel is injected into the exhaust line upstream of the respective oxidation catalytic converter, is burned on the oxidation catalytic converter and the exhaust-gas temperature is thereby raised to the soot ignition temperature. Oxidation catalytic converters contain primarily platinum and/or palladium as catalytically active components, and are known to a person skilled in the art.

The nitrogen oxide conversion may also be improved by virtue of a nitrogen oxide storage catalytic converter also being arranged upstream or downstream of each soot filter. If said nitrogen oxide storage catalytic converters are arranged upstream of the filters, or if the filters are coated with said nitrogen oxide storage catalyst, then the oxidation action thereof can also be utilized under lean exhaust-gas conditions to increase the temperature of the filter to the soot ignition temperature by means of the combustion of injected hydrocarbons, as described immediately above. In this case, the regeneration of the soot filter may also be followed by a desulfurization of the nitrogen oxide storage catalyst, for which very high exhaust-gas temperatures are again required. However, the exhaust gas must be enriched for the desulfurization process. Said method sequence is described in the applicant's European patent EP 1154130 B1: after the regeneration of the soot filter, the exhaust gas is enriched and the nitrogen oxide storage catalytic converters are desulfurized.

The method according to the invention has considerable advantages over the operating method of the exhaust-gas purification system described in DE 103 93 184 T5. According to DE 103 93 184 T5, the soot filters, which are if appropriate provided in addition to the nitrogen oxide storage catalytic converters, are also regenerated alternately from time to time by raising the exhaust-gas temperature in the corresponding exhaust line to over 550° C. At said temperature, the denitrogenization catalytic converter which is arranged in said exhaust line is however no longer capable of storing the nitrogen oxides which are emitted by the engine. Said nitrogen oxides are therefore discharged via the oxidation catalytic converter, which is situated in the common exhaust line, into the environment. This is exacerbated by the following factors: at an exhaust-gas temperature of 550° C., the chemical equilibrium between NO and $NO_2$ lies almost entirely on the side of the less environmentally harmful nitrogen monoxide. If said exhaust gas is now mixed with the relatively cool exhaust gas from the second exhaust line and conducted via the oxidation catalytic converter in the common exhaust line, the nitrogen monoxide contained in said exhaust gas is, on account of the relatively low mixture temperature, oxidized with a high level of effectiveness to form the very environmentally harmful nitrogen dioxide. Furthermore, to save fuel, the regeneration of the soot filter is preferably carried out at operating points of the engine at high load, at which the exhaust-gas temperature is relatively high from the outset. At such operating points, however, the diesel engine itself emits relatively high proportions of nitrogen oxides. In said exhaust-gas purification system, therefore, significantly increased $NO_2$ emissions are to be expected during the regeneration of the soot filter. In contrast, the method proposed here is capable of effectively reducing the nitrogen oxide emissions during the regeneration of the soot filter.

BRIEF DESCRIPTION OF THE FIGURES

The invention is explained in more detail below on the basis of FIGS. 1 to 2, in which:

FIG. 1 shows the activity curves of different denitrogenization catalytic converters which are suitable for the invention. Within an activity window, the nitrogen oxide conversion rises steeply with temperature starting from low exhaust-gas temperatures, passes through a more or less wide maximum, and then quickly falls again at high temperatures. As shown in FIG. 1, the temperature interval for the regeneration of a soot filter lies above the activity window of denitrogenization catalytic converters. The activity of the denitrogenization catalytic converters has already fallen sharply when the regeneration temperature is reached, such that without additional measures, a significant part of the nitrogen oxides contained in the exhaust gas is emitted untreated during the regeneration of the filter if the soot filter and denitrogenization catalytic converters are situated in the same exhaust section.

FIG. 2 shows an exhaust-gas purification system for carrying out the method according to the invention. The reference symbol (1) denotes a lean-burn engine having two cylinder banks (2) and (2'). The exhaust gases from said cylinder banks are discharged into the two exhaust lines (3) and (3'). The two exhaust lines (3) and (3') are merged at the opening-in point (4) to form a common exhaust line (5). The soot which is contained in the exhaust gas of the lean-burn engine is filtered out of the exhaust gas by the soot filters (6) and (6'). For the conversion of the nitrogen oxides emitted by the lean-burn engine (1), the common exhaust line comprises a denitrogenization catalytic converter (7). The latter may be a nitrogen oxide storage catalytic converter, an SCR catalytic converter or an HC-DeNOx catalytic converter. The nitrogen oxides in the common exhaust line are therefore removed by means of an SCR catalytic converter, a nitrogen oxide storage catalytic converter or an HC-DeNOx catalytic converter.

In the case of an SCR catalytic converter, a dosing device (8) for injecting ammonia, or a compound which breaks down to form ammonia, is situated upstream of the catalytic converter.

Figure 1:
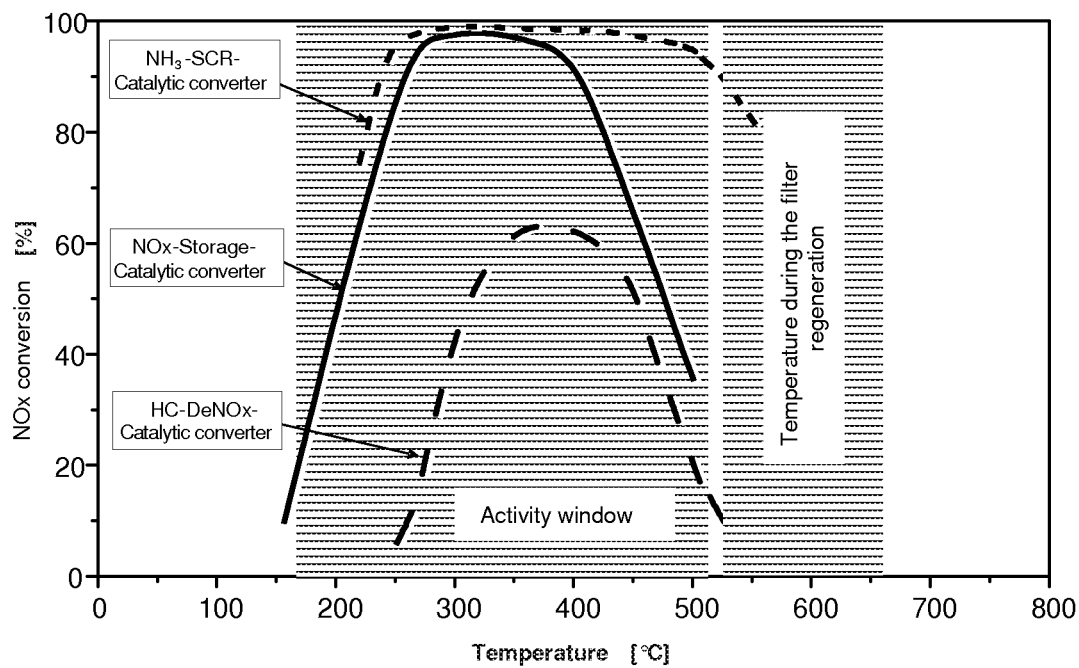
FIG. 1: shows typical activity curves of different denitrogenization catalytic converters
Figure 2:
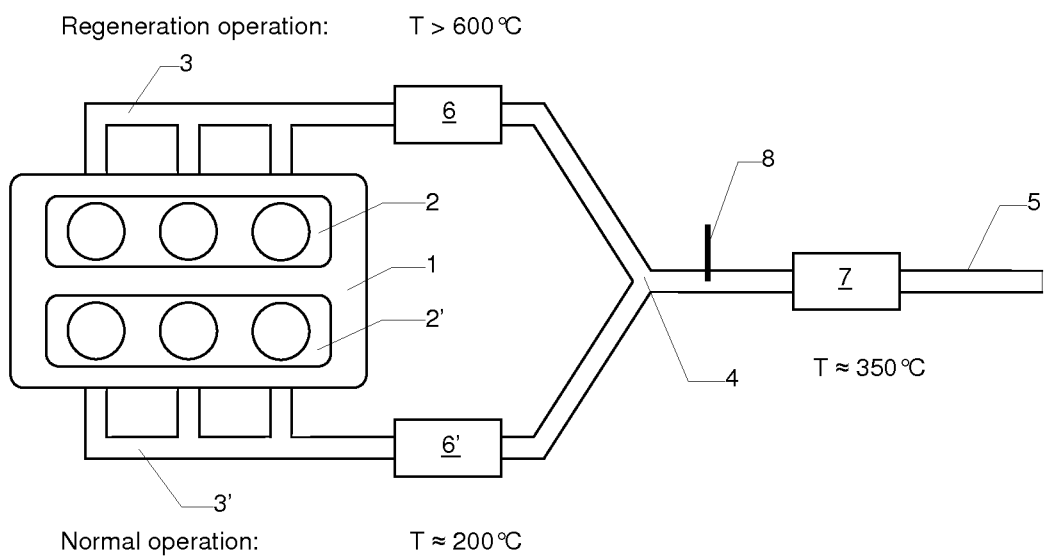
FIG. 2: shows an exhaust-gas purification system for carrying out the method for regenerating a soot filter with reduced emissions of nitrogen oxides

In FIG. 2, it is assumed that the soot filter (6) must be regenerated. The cylinder bank (2) is therefore operated such that the exhaust-gas temperature is greater than 600° C. and the burning-off of the soot can be ignited. During the regeneration of the soot filter (6), the second cylinder bank (2') is operated "normally" corresponding to the present driving state of the vehicle. In FIG. 2, it is assumed that the exhaust gas has a temperature of approximately 200° C. in said operating state. The two exhaust-gas flows are mixed at the opening-in point (4) to form a common exhaust-gas flow with a mixture temperature of approximately 350° C.

Figure 3:
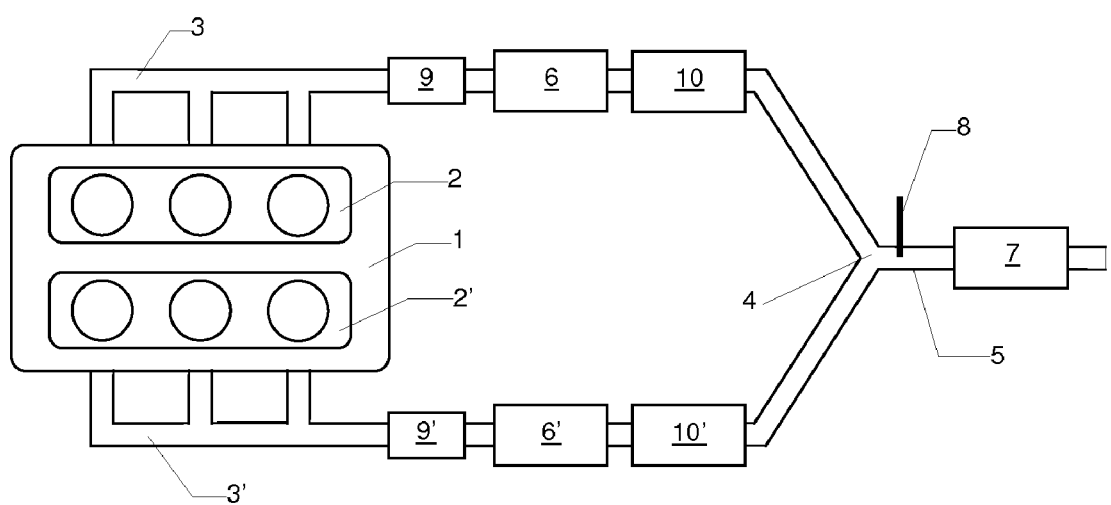
FIG. 3: shows a further embodiment of the exhaust-gas purification system for carrying out the method for regeneration with reduced emissions of nitrogen oxides

FIG. 3 shows a variant of the exhaust-gas purification system for carrying out the method. In each case one oxidation catalytic converter or one nitrogen oxide storage catalytic converter (9) and (9') is provided in the exhaust lines upstream of the soot filters (6) and (6'). Furthermore, a denitrogenization catalytic converter, such as for example in each case one nitrogen oxide storage catalytic converter (10) and (10'), may be arranged downstream of the soot filters.

In said variants of the exhaust-gas purification system, the exhaust gas in the first and second exhaust lines is conducted firstly across an oxidation catalytic converter (9 and 9') and subsequently across the soot filter (6 and 6'). The exhaust gas may subsequently also be conducted over a nitrogen oxide storage catalytic converter (10 and 10').

Furthermore, an oxidation catalytic converter may also be positioned downstream of the denitrogenization catalytic converter (7) in order to reduce the leakage of reducing agent into the atmosphere.

In FIGS. 2 and 3, it has been assumed that the lean-burn engine has two separate cylinder banks which discharge their exhaust gases into correspondingly associated exhaust lines. The method may however also be used in an in-line engine. It must be ensured merely that the exhaust gases of the cylinders are discharged into two separate exhaust lines.

What is claimed is:

1. A method for regenerating soot filters in an exhaust system of a lean-burn engine, said method comprising:
    exposing a first exhaust gas stream to a first soot filter, wherein said first soot filter is located in a first exhaust line and the first exhaust line receives the first exhaust gas stream from a first plurality of cylinders;
    exposing a second exhaust gas stream to a second soot filter, wherein said second soot filter is located in a second exhaust line and the second exhaust line receives the second exhaust gas stream from a second plurality of cylinders;
    combining the first exhaust gas stream and the second exhaust gas stream downstream of the first soot filter and downstream of the second soot filter to form a mixed exhaust gas flow in a common exhaust line, wherein identical exhaust-gas conditions prevail in both exhaust lines during a normal operation of the engine, and each of the soot filters filter out soot that is generated by the engine;
    exposing the mixed exhaust gas flow to a denitrogenization catalytic converter; and
    regenerating the first soot filter and the second soot filter at different times by means of an increase in an exhaust-gas temperature in an associated exhaust line to a soot ignition temperature while normal exhaust-gas conditions continue to prevail in the other exhaust line, such that the common exhaust line has a temperature between an exhaust-gas temperature of normal operation and an exhaust-gas temperature during regeneration
    wherein the mixed exhaust gas flow contains nitrogen oxides that during a lean phase are stored on the denitrogenization catalytic converter and during a rich phase are released by the denitrogenization catalytic converter and are converted to nitrogen.

2. The method of claim 1, wherein the exhaust-gas temperature is raised to the soot ignition temperature by engine-internal measures.

3. The method of claim 2, wherein the exhaust-gas temperature is raised to the soot ignition temperature by means of a post-injection of fuel, by means of a late combustion position, by means of a multi-stage combustion or by means of a combination thereof.

4. The method of claim 1, wherein the exhaust-gas temperature is raised to the soot ignition temperature by means of external heating.

5. The method of claim 1, wherein the first soot filter and the second soot filter are coated with an oxidation catalyst and the exhaust-gas temperature is raised to the soot ignition temperature by means of an injection of hydrocarbons or their decomposition products upstream of the respective soot filter, and the catalytic combustion of the hydrocarbons or their decomposition products on the oxidation catalyst.

6. The method of claim 1, wherein the first exhaust line and the second exhaust line each comprise, upstream of their respective soot filters, in each case one oxidation catalytic converter and the exhaust-gas temperature is raised to the soot ignition temperature by means of an injection of hydrocarbons or their decomposition products upstream of the oxidation catalytic converter, and a catalytic combustion of the hydrocarbons or their decomposition products on the oxidation catalytic converter.

7. The method of claim 1, wherein the soot ignition temperature is reduced by coating each of the first soot filter and the second soot filter with a soot ignition coating.

8. The method of claim 1, wherein the nitrogen oxides in the common exhaust line are removed by means of an SCR catalytic converter, a nitrogen oxide storage catalytic converter or an HC-DeNOx catalytic converter as a denitrogenization catalytic converter.

9. The method of claim 1, wherein the exhaust gas stream in each of the first exhaust line and the second exhaust line is conducted firstly across an oxidation catalytic converter and subsequently across the respective soot filter.

10. The method of claim 8, wherein the first exhaust gas stream in first exhaust line is conducted first across a first oxidation catalytic converter, then across the first soot filter and subsequently across a first nitrogen oxide storage catalytic converter and the second exhaust gas stream in the second exhaust line is conducted first across a second oxidation catalytic converter, then across the second soot filter and subsequently across a second nitrogen oxide storage catalytic converter.

11. A method for regenerating soot filters in an exhaust system of a lean-burn engine, said method comprising:
    exposing a first exhaust gas stream to a first soot filter, wherein said first soot filter is located in a first exhaust line and the first exhaust line receives the first exhaust gas stream from a first plurality of cylinders;
    exposing a second exhaust gas stream to a second soot filter, wherein said second soot filter is located in a second exhaust line and the second exhaust line receives the second exhaust gas stream from a second plurality of cylinders;
    combining the first exhaust gas stream and the second exhaust gas stream downstream of the first soot filter and downstream of the second soot filter to form a mixed exhaust gas flow in a common exhaust line, wherein identical exhaust-gas conditions prevail in both exhaust lines during a normal operation of the engine, and each of the soot filters filter out soot that is generated by the engine;
    exposing the mixed exhaust gas flow to a nitrogen oxide storage catalytic converter that stores nitrogen oxide in the form of nitrates; and
    regenerating the first soot filter and the second soot filter at different times by means of an increase in an exhaust-gas temperature in an associated exhaust line to a soot ignition temperature while normal exhaust-gas conditions continue to prevail in the other exhaust line, such that the common exhaust line has a temperature between an exhaust-gas temperature of normal operation and an exhaust-gas temperature during regeneration
    wherein the mixed exhaust gas flow contains nitrogen oxides that during a lean phase are stored on the nitrogen oxide storage catalytic converter and during a rich phase are released by the nitrogen oxide storage catalytic converter and are converted to nitrogen.

12. The method of claim 11, wherein the exhaust-gas temperature is raised to the soot ignition temperature by engine-internal measures.

13. The method of claim 12, wherein the exhaust-gas temperature is raised to the soot ignition temperature by means of a post-injection of fuel, by means of a late combustion position, by means of a multi-stage combustion or by means of a combination thereof.

14. The method of claim 11, wherein the exhaust-gas temperature is raised to the soot ignition temperature by means of external heating.

15. The method of claim 11, wherein the first soot filter and the second soot filter are coated with an oxidation catalyst and the exhaust-gas temperature is raised to the soot ignition temperature by means of an injection of hydrocarbons or their decomposition products upstream of the respective soot filter, and the catalytic combustion of the hydrocarbons or their decomposition products on the oxidation catalyst.

16. The method of claim 11, wherein the first exhaust line and the second exhaust lines each comprise, upstream of their respective soot filters, in each case one oxidation catalytic converter and the exhaust-gas temperature is raised to the soot ignition temperature by means of an injection of hydrocarbons or their decomposition products upstream of the oxidation catalytic converter, and a catalytic combustion of the hydrocarbons or their decomposition products on the oxidation catalytic converter.

17. The method of claim 11, wherein the soot ignition temperature is reduced by coating each of the first soot filter and the second soot filter with a soot ignition coating.

18. The method of claim 11, wherein the exhaust gas stream in each of the first exhaust line and the second exhaust line is conducted firstly across an oxidation catalytic converter and subsequently across the respective soot filter.

19. The method of claim 11, wherein the first exhaust gas stream in first exhaust line is conducted first across a first oxidation catalytic converter, then across the first soot filter and subsequently across a first nitrogen oxide storage catalytic converter and the second exhaust gas stream in the second exhaust line is conducted first across a second oxidation catalytic converter, then across the second soot filter and subsequently across a second nitrogen oxide storage catalytic converter.

* * * * *